United States Patent
Yu et al.

(10) Patent No.: US 12,006,227 B2
(45) Date of Patent: Jun. 11, 2024

(54) NICKEL-IRON WET TREATMENT METHOD AND APPLICATION THEREOF

(71) Applicants: GUANGDONG BRUNP RECYCLING TECHNOLOGY CO., LTD., Guangdong (CN); HUNAN BRUNP RECYCLING TECHNOLOGY CO., LTD., Hunan (CN); HUNAN BRUNP EV RECYCLING CO., LTD., Hunan (CN)

(72) Inventors: Haijun Yu, Guangdong (CN); Yinghao Xie, Guangdong (CN); Aixia Li, Guangdong (CN); Xuemei Zhang, Guangdong (CN); Changdong Li, Guangdong (CN)

(73) Assignees: Guangdong Brunp Recycling Technology Co., Ltd., Guangdong (CN); Hunan Brunp Recycling Technology Co., Ltd., Hunan (CN); Hunan Brunp Ev Recycling Co., Ltd., Hunan (CN)

( * ) Notice: Subject to any disclaimer, the term of this patent is extended or adjusted under 35 U.S.C. 154(b) by 0 days.

(21) Appl. No.: 18/260,241

(22) PCT Filed: Jun. 6, 2022

(86) PCT No.: PCT/CN2022/097183
§ 371 (c)(1),
(2) Date: Jun. 30, 2023

(87) PCT Pub. No.: WO2023/000847
PCT Pub. Date: Jan. 26, 2023

(65) Prior Publication Data
US 2024/0034639 A1 Feb. 1, 2024

(30) Foreign Application Priority Data
Jul. 20, 2021 (CN) .......................... 202110818269.0

(51) Int. Cl.
*C01G 49/06* (2006.01)
*C01G 53/00* (2006.01)
(Continued)

(52) U.S. Cl.
CPC .......... *C01G 49/06* (2013.01); *C01G 53/003* (2013.01); *C01G 53/10* (2013.01); *C22B 1/24* (2013.01); *C22B 3/22* (2013.01); *C22B 7/007* (2013.01)

(58) Field of Classification Search
USPC ...................................... 423/150.3
See application file for complete search history.

(56) References Cited

U.S. PATENT DOCUMENTS 2,805,937 A   9/1957  Bennedsen et al.
4,042,474 A * 8/1977  Saarinen ............ C22B 23/0461
                                              423/150.6
(Continued)

FOREIGN PATENT DOCUMENTS

CA      3144899 A1    2/2021
CN    102057064 B     8/2013
(Continued)

OTHER PUBLICATIONS

English translation of CN-112941314-A Description (Year: 2021).*
(Continued)

*Primary Examiner* — Samir Shah
*Assistant Examiner* — Zachary John Baum
(74) *Attorney, Agent, or Firm* — ArentFox Schiff LLP

(57) ABSTRACT

Disclosed are a nickel-iron wet treatment method and an application thereof. The treatment method comprises: in a high-pressure oxygen environment, mixing a crushed nickel-iron material, sulphuric acid and a corrosion aid, performing an acid leaching reaction, then performing solid-liquid separation on slurry subjected to acid leaching, adding (Continued)

an oxidant into the obtained filtrate, performing heating, removing the corrosion aid, adding a precipitating agent into the filtrate, controlling the pH value of the filtrate, and performing solid-liquid separation to obtain a ferric hydroxide precipitate and a nickel-containing filtrate; and performing extraction and back extraction on the nickel-containing filtrate to prepare battery-grade nickel sulphate. According to the present invention, the nickel-iron is subjected to oxidation acid dissolution in cooperation with the corrosion aid under the high-pressure oxygen and acidic conditions; the nickel-iron is extremely prone to oxidation in the high-pressure oxygen environment; and a strong oxidant is added into the filtrate subsequently, so that ferrous ions in the filtrate are completely converted into ferric ions, and the corrosion aid can be oxidized to generate pollution-free carbon dioxide and water, thereby avoiding the impact of the corrosion aid on the subsequent extraction process.

3 Claims, 1 Drawing Sheet

(51) Int. Cl.
  *C01G 53/10* (2006.01)
  *C22B 1/24* (2006.01)
  *C22B 3/22* (2006.01)
  *C22B 7/00* (2006.01)

(56) References Cited

U.S. PATENT DOCUMENTS

| | | | |
|---|---|---|---|
| 4,060,464 A | 11/1977 | Fahlstrom et al. | |
| 2019/0024211 A1* | 1/2019 | Asadrokht | C22B 3/06 |

FOREIGN PATENT DOCUMENTS

| | | | | |
|---|---|---|---|---|
| CN | 103468973 A | | 12/2013 | |
| CN | 103911514 A | | 7/2014 | |
| CN | 204848306 U | * | 12/2015 | |
| CN | 106829907 A | | 6/2017 | |
| CN | 109457112 A | | 3/2019 | |
| CN | 109897957 A | | 6/2019 | |
| CN | 111498918 A | | 8/2020 | |
| CN | 112481502 A | | 3/2021 | |
| CN | 112941313 A | * | 6/2021 | C21B 13/0066 |
| CN | 112941314 A | | 6/2021 | |
| CN | 112941314 A | * | 6/2021 | C01G 49/02 |
| CN | 113667825 A | | 11/2021 | |
| GB | 757323 A | | 9/1956 | |
| KR | 101403185 B1 | | 6/2014 | |
| WO | WO-2017185946 A1 | * | 11/2017 | |
| WO | 2021018796 A1 | | 2/2021 | |

OTHER PUBLICATIONS

English translation of CN-112941313-A Description (Year: 2021).*
English translation of WO-2017185946-A1 Description (Year: 2017).*
English translation of CN-204848306-U Description (Year: 2015).*
Office Action in CN202110818269.0, mailed May 9, 2022, 14 pages.
International Search Report in PCT/CN2022/097183, mailed Sep. 5, 2022, 6 pages.

* cited by examiner

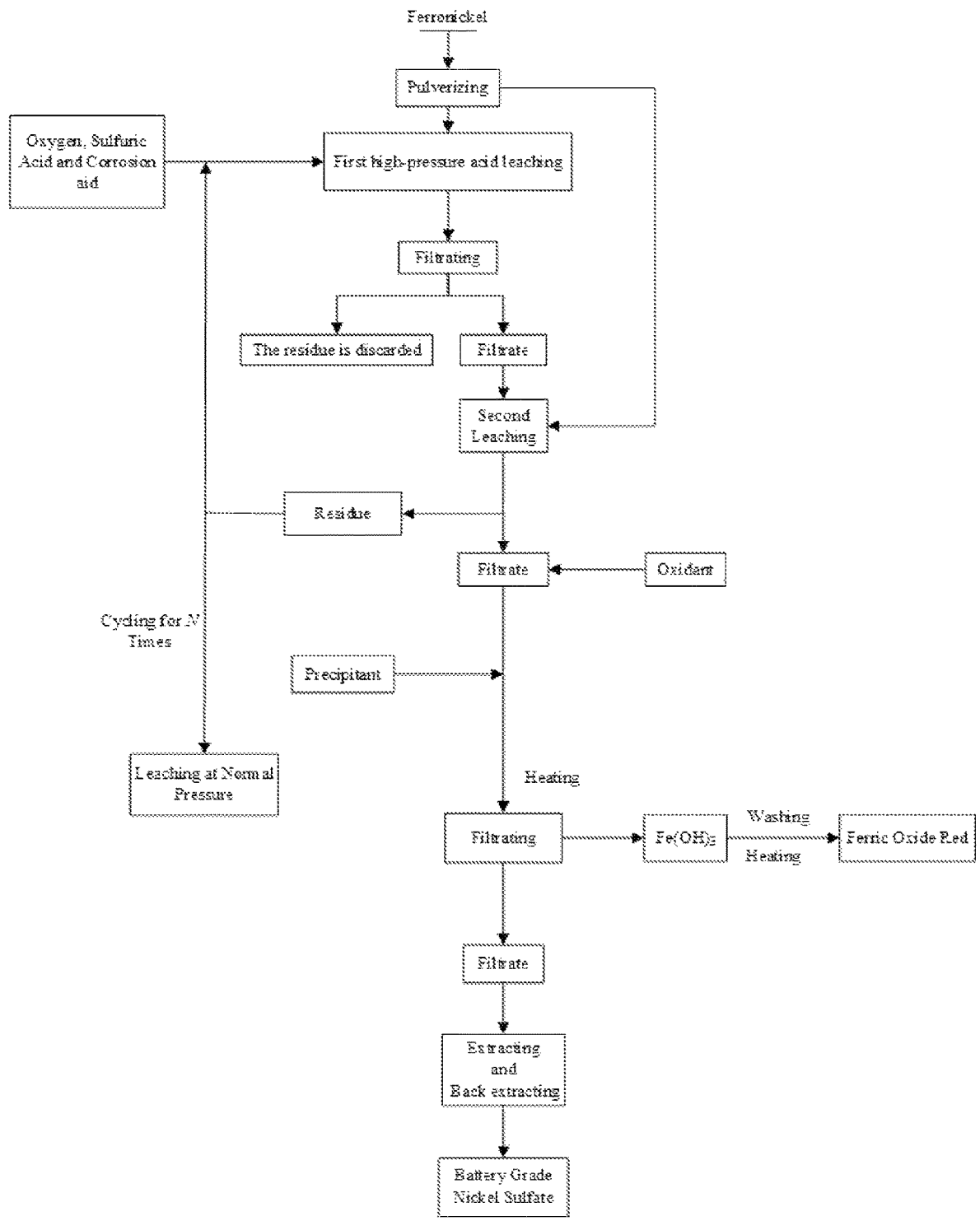

NICKEL-IRON WET TREATMENT METHOD AND APPLICATION THEREOF

CROSS REFERENCE TO RELATED APPLICATION(S)

This application is a National Phase entry of PCT Application No. PCT/CN2022/097183, entitled "NICKEL-IRON WET TREATMENT METHOD AND APPLICATION THEREOF" and filed on Jun. 6, 2022, which claims priority of Chinese Application No. 202110818269.0 entitled "NICKEL-IRON WET TREATMENT METHOD AND APPLICATION THEREOF" and filed on Jul. 20, 2021, both of which are expressly incorporated by reference herein in their entirety.

TECHNICAL FIELD

The present disclosure relates to the technical field of metallurgy, and in particular to a wet treatment method for ferronickel and use thereof.

BACKGROUND

Currently, there are few methods for value-added use of ferronickel. In the related art, a method for preparing nickel sulfate solution and battery-grade ferric phosphate with nickel-containing pig iron includes the following steps: pretreating a raw material, acid leaching, precipitating, drying ferric phosphate, extracting a nickel-containing filtrate, and back extraction to obtain the nickel sulfate solution. The method has advantages of simple, high recovery rate of nickel-containing pig iron, low cost, and good product performance. However, the acid leaching process is slow and has a long reaction time, and cannot be used in mass production.

SUMMARY

The present disclosure is to solve at least one of the technical problems of the prior art. The present disclosure provides a wet treatment method for ferronickel and use thereof. The method of the present disclosure has advantages of short technological process, low auxiliary material consumption, high leaching yield, and the like.

According to an aspect of the present disclosure, the present disclosure provides a wet treatment method for ferronickel, including the following steps:

S1, mixing pulverized ferronickel, sulfuric acid, and a corrosion aid in a high-pressure oxygen atmosphere, and performing acid leaching reaction;

S2, subjecting an acid-leaching slurry obtained in step S1 to a solid-liquid separation process, adding an oxidant into a filtrate obtained and heating the filtrate, and removing the corrosion aid; and, S3, adding a precipitant into the filtrate, controlling pH of the filtrate, and subjecting the filtrate to a solid-liquid separation process to obtain ferric hydroxide precipitation and a nickel-containing filtrate.

In some embodiments of the present disclosure, in step S1, the corrosion aid is at least one of hydrogen peroxide, acetic acid, acetylacetone, oxalic acid, and glycine. The corrosion aid can accelerate the oxidation and corrode ferronickel rapidly.

As a corrosion aid, hydrogen peroxide can facilitate oxidation and leaching; acetylacetone and glycine can complex with ferronickel to accelerate the reaction; acetic acid and oxalic acid not only can facilitate acidic dissolution but also can complex with the ferronickel, so as to accelerate the rate throughout the reaction.

In some embodiments of the present disclosure, in step S1, a concentration of the sulfuric acid is in a range of 3 mol/L to 8 mol/L In some embodiments of the present disclosure, in step S1, a pressure of the acid leaching reaction is in a range of 3.0 MPa to 6.5 MPa, and a temperature of the reaction is in a range of 50° C. to 90° C.

In some embodiments of the present disclosure, in step S2, the oxidant is at least one of chlorate, nitrite, nitrate, and persulfate. Using a strong oxidant can facilitate transforming the corrosion aid into carbon dioxide or water, and prevent the corrosion aid from affecting the following organic extraction.

In some embodiments of the present disclosure, in step S2, a residue obtained in the solid-liquid separation process can be subjected back to the acid leaching in step S1, saving raw materials.

In some embodiments of the present disclosure, in step S2, a temperature of the heating is in a range of 60° C. to 95° C. Controlling the temperature of the heating can facilitate accelerating the reaction, and removing carbon dioxide generated by oxidizing the corrosion aid by the oxidant.

In some embodiments of the present disclosure, in step S3, the precipitant is at least one of ammonium hydroxide, sodium hydroxide, sodium carbonate, and sodium bicarbonate.

In some embodiments of the present disclosure, in step S3, the pH of the filtrate is in a range of 3 to 3.5. When the pH is in a range of 3 to 3.5, the ferric hydroxide can be completely precipitated and separated out, and nickel ions can be maintained.

In some embodiments of the present disclosure, step S3 further includes: washing the ferric hydroxide precipitation and heating the ferric hydroxide precipitation to obtain ferric oxide red.

In some embodiments of the present disclosure, the wet treatment method for ferronickel includes: in step S2, adding ferronickel into the filtrate obtained to perform a displacement leaching reaction, and performing filtration to obtain a ferronickel residue and a cooper-removed leaching solution. The ferronickel residue is subjected back to the acid leaching reaction in step S1, and the oxidant is added into the leaching solution for the subsequent process. The displacement leaching reaction can be carried out at normal pressure without oxygen. The filtrate obtained by the acid leaching reaction at high pressure contains a large number of hydrogen ions and a large number of ferric ions, and a small number of copper ions. The ferronickel is added into the filtrate to perform the displacement leaching reaction, such that a second leaching is achieved, and the copper ions can be displaced, thus obtaining ferrous ions. Thereafter, the oxidant is added. The second leaching is mainly to carry out in the displacement leaching reaction, and can improve a concentration of the nickel ions and the concentration of the ferric ions, and remove the copper ions. In addition, as the ferronickel residue is reused in the acid leaching reaction in an earlier step, a content of cooper will increase. However, as a content of cooper in the ferronickel is small, a circulation can be carried out for a number of times, and the copper can be accumulated in the ferronickel residue in the second leaching. The ferronickel residue is tested. When the content of the cooper is high, the ferronickel residue is subjected to an acid leaching reaction at normal pressure and the nickel and the iron are selectively leached out to obtain a leaching solution and a residue. The leaching solution is subjected back to high-pressure acid leaching in step S1, and the residue is conveyed to a copper factory for further treatment.

In the present disclosure, use of a nickel-containing filtrate obtained by the method in the present disclosure in preparing battery-grade nickel sulfate is further provided. Specifically, an extraction agent is added into the nickel-containing filtrate to extract nickel; the system is allowed to standing; a nickel-containing organic phase and an impurity-containing raffinate are obtained by separation; and a $H_2SO_4$ solution having a concentration in a range of 3 mol/L to 5 mol/L is used to back extract nickel from the nickel-containing organic phase, thus obtaining a battery-grade nickel sulfate solution.

In some embodiments of the present disclosure, the extraction agent is selected from one or more of P204, P507, DEHPA or Cyanex272.

A preferred embodiment of the present disclosure has at least the following benefits.

In the present disclosure, in a high-pressure oxygen atmosphere and an acidic condition, ferronickel is subjected to oxidation and acid dissolution with an aid of the corrosion aid. The ferronickel is easy to be oxidized in a high-pressure oxygen atmosphere, and a reaction rate can be accelerated by the corrosion aid. Thereafter, a strong oxidant such as chlorate, nitrite, nitrate, persulfate and the like can be added in the filtrate. This not only ensures that all the ferrous irons are transformed to ferric irons, but also oxidizes the corrosion aid. The corrosion aid is oxidized and transformed to non-polluting carbon dioxide and water, so that the corrosion aid will not affect the subsequent extraction process. The whole reaction is fast, and the leaching rate is as high as 97% with the synergistic effect of the corrosion aid and oxidant. Besides, no poisonous gas is discharged and the environment pollution is avoided.

BRIEF DESCRIPTION OF DRAWINGS

The present disclosure will be further illustrated with reference to the drawings and the embodiments hereinafter.

FIG. 1 is a process flowchart of Embodiment 1 of the present disclosure.

DETAILED DESCRIPTION

Hereinafter, the concept of the present disclosure and the technical effects produced by it will be described clearly and completely with reference to the embodiments, so as to fully understand the purpose, features and effects of the present disclosure. Obviously, the described embodiments are only a part of the embodiments of the present disclosure, rather than all the embodiments. Based on the embodiments of the present disclosure, other embodiments obtained by one skilled in the art without creative work shall fall within the protection scope of the present disclosure.

Embodiment 1

Referring to FIG. 1, a wet treatment method for ferronickel included the following steps.
(1) Pretreating a raw material: ferronickel having a nickel content of 22.35% was pulverized to powders or particles.
(2) First high-pressure acid leaching: in a high-pressure oxygen atmosphere at 6.5 MPa and 90° C., the pulverized ferronickel obtained in step (1) was subjected to acid leaching with sulfuric acid having a concentration of 3 mol/L, and acetic acid was added in to obtain a slurry mixture. A solid-liquid ratio of the slurry mixture was 1:100 g/mL, and the acid leaching reaction lasted for 3 hours.
(3) Filtrating: after completing the reaction in step (2), filtration was performed to obtain a filtrate and a residue. The pulverized ferronickel was added in the filtrate and subjected to a second leaching to displace the small number of copper ions. Filtration was performed again to obtain a ferronickel reside and a copper-removed filtrate. The ferronickel residue was reused in the first high-pressure acid leaching in step (2). After a plurality of cycles, when the ferronickel residue was tested to have a relatively high copper content, the ferronickel residue would be subjected to leaching at normal pressure to obtain a leaching solution and a leaching residue. The leaching solution was reused in the first high-pressure acid leaching, and the leaching residue was conveyed to a cooper factory for further treatment.
(4) Precipitating process: ammonium chlorate was added in the copper-removed filtrate in step (3) to oxidize the ferrous ions in the cooper-removed filtrate, and heated at a temperature between 60° C. to 70° C. to remove the acetic acid, so as to prevent the acetic acid from affecting the subsequent extracting process.
(5) Precipitating under control: ammonium hydroxide was added in the filtrate obtained in step (4), and pH of the filtrate was controlled in a range of 3 to 3.5, and filtration was performed again to obtain a ferric hydroxide precipitation and a nickel-containing filtrate. The ferric hydroxide precipitation was washed and heated to obtain ferric oxide red.

Preparing nickel sulfate: the nickel-containing filtrate was extracted with an extraction agent P507 to extract nickel, left standing, and separated to obtain a nickel-containing organic phase and an impurity-containing raffinate; and then the nickel was back extracted from the nickel-containing organic phase with a $H_2SO_4$ solution having a concentration of 5 mol/L, so as to obtain a battery-grade nickel sulfate solution.

A nickel sulfate crystal obtained by evaporative crystallization was analyzed. A content of Ni was 22.12%, a content of Co was 0.021%, a content of Cu was 0.00038%, and a content of Fe was 0.00028%, which conform to a product standard of a battery-grade nickel sulfate.

Embodiment 2

A wet treatment method for ferronickel included the following steps.
(6) Pretreating a raw material: ferronickel having a nickel content of 25.85% was pulverized to powders or particles.
(7) High-pressure acid leaching: in a high-pressure oxygen atmosphere at 3.0 MPa and 50° C., the pulverized raw material obtained in step (1) was subjected to acid leaching with sulfuric acid having a concentration of 8 mol/L, and acetylacetone was added in to obtain a slurry mixture. A solid-liquid ratio of the slurry mixture was 1:200 g/mL, and the acid leaching reaction lasted for 1.5 hours.
(8) Filtrating: after completing the reaction in step (2), filtration was performed to obtain a filtrate and a residue. The pulverized ferronickel was added in the filtrate and subjected to a second leaching to displace the small number of copper ions. Filtration was performed again to obtain a ferronickel reside and a copper-removed filtrate. The ferronickel residue was reused in the first high-pressure acid leaching in step (2). After a plurality of cycles, when the ferronickel residue was tested to have a relatively high copper content, the ferronickel residue would be subjected to leaching at normal pressure to obtain a leaching solution and a leaching residue. The leaching solution was reused in the first high-pressure acid leaching, and the leaching residue was conveyed to a cooper factory for further treatment.

(9) Precipitating process: ammonium nitrate was added in the copper-removed filtrate in step (3) to oxidize the ferrous ions in the cooper-removed filtrate, and heated at a temperature between 75° C. to 85° C. to remove the acetylacetone, so as to prevent the acetylacetone from affecting the subsequent extracting process.

(10) Precipitating under control: ammonium hydroxide was added in the filtrate obtained in step (4), and pH of the filtrate was controlled in a range of 3 to 3.5, and filtration was performed again to obtain a ferric hydroxide precipitation and a nickel-containing filtrate. The ferric hydroxide precipitation was washed and heated to obtain ferric oxide red.

Preparing nickel sulfate: the nickel-containing filtrate was extracted with an extraction agent Cyanex272 to extract nickel, left standing, and separated to obtain a nickel-containing organic phase and an impurity-containing raffinate; and then the nickel was back extracted from the nickel-containing organic phase with a $H_2SO_4$ solution having a concentration of 3 mol/L, so as to obtain a battery-grade nickel sulfate solution.

A nickel sulfate crystal obtained by evaporative crystallization was analyzed. A content of Ni was 22.06%, a content of Co was 0.027%, a content of Cu was 0.00031%, and a content of Fe was 0.00012%, which conform to a product standard of a battery-grade nickel sulfate.

Embodiment 3

A wet treatment method for ferronickel included the following steps.

(11) Pretreating a raw material: ferronickel having a nickel content of 55.35% was pulverized to powders or particles.

(12) High-pressure acid leaching: in a high-pressure oxygen atmosphere at 5.0 MPa and 70° C., the pulverized raw material obtained in step (1) was subjected to acid leaching with sulfuric acid having a concentration of 5 mol/L, and oxalic acid was added in to obtain a slurry mixture. A solid-liquid ratio of the slurry mixture was 1:300 g/mL, and the acid leaching reaction lasted for 3 hours.

(13) Filtrating: after completing the reaction in step (2), filtration was performed to obtain a filtrate and a residue. The pulverized ferronickel was added in the filtrate and subjected to a second leaching to displace the small number of copper ions. Filtration was performed again to obtain a ferronickel reside and a copper-removed filtrate. The ferronickel residue was reused in the first high-pressure acid leaching in step (2). After a plurality of cycles, when the ferronickel residue was tested to have a relatively high copper content, the ferronickel residue would be subjected to leaching at normal pressure to obtain a leaching solution and a leaching residue. The leaching solution was reused in the first high-pressure acid leaching, and the leaching residue was conveyed to a cooper factory for further treatment.

(14) Precipitating process: ammonium nitrate was added in the copper-removed filtrate in step (3) to oxidize the ferrous ions in the cooper-removed filtrate, and heated at a temperature between 80° C. to 95° C. to remove the oxalic acid, so as to prevent the oxalic acid from affecting the subsequent extracting process.

(15) Precipitating under control: ammonium hydroxide was added in the filtrate obtained in step (4), and pH of the filtrate was controlled in a range of 3 to 3.5, and filtration was performed again to obtain a ferric hydroxide precipitation and a nickel-containing filtrate. The ferric hydroxide precipitation was washed and heated to obtain ferric oxide red.

Preparing nickel sulfate: the nickel-containing filtrate was extracted with a mixed liquid of P204 and P507 to extract nickel, left standing, and separated to obtain a nickel-containing organic phase and an impurity-containing raffinate; and then nickel was back extracted from the nickel-containing organic phase with a $H_2SO_4$ solution having a concentration of 4 mol/L, so as to obtain a battery-grade nickel sulfate solution.

A nickel sulfate crystal obtained by evaporative crystallization was analyzed. A content of Ni was 22.18%, a content of Co was 0.012%, a content of Cu was 0.00028%, and a content of Fe was 0.00011%, which conform to a product standard of a battery-grade nickel sulfate.

The embodiments of the present disclosure are described in detail above with reference to the drawings, but the present disclosure is not limited to the above-mentioned embodiments. Within the scope of knowledge possessed by one skilled in the art, various changes can be made without departing from the purpose of the present disclosure. In addition, in the case of no conflict, the embodiments of the present disclosure and the features in the embodiments can be combined with each other.

What is claimed is:

1. A wet treatment method for ferronickel, comprising the following steps:
    (1) pretreating a raw material: ferronickel having a nickel content of 22.35% is pulverized to powders or particles;
    (2) performing first high-pressure acid leaching: in a high-pressure oxygen atmosphere at 6.5 MPa and 90° C., the pulverized ferronickel obtained in step (1) is subjected to acid leaching with sulfuric acid having a concentration of 3 mol/L, and performing acid leaching reaction; acetic acid is added in to obtain a slurry mixture; a solid-liquid ratio of the slurry mixture is 1:100 g/mL, and the acid leaching reaction is performed for 3 h;
    (3) filtrating: after completing the reaction in step (2), filtration is performed to obtain a filtrate and a residue; the pulverized ferronickel obtained in step (1) is added in the filtrate and subjected to a second leaching to displace the small number of copper ions; filtration is performed again to obtain a ferronickel reside and a copper-removed filtrate; the ferronickel residue is reused in the first high-pressure acid leaching in step (2); after a plurality of cycles, when the ferronickel residue is tested to reach a predetermined copper content, the ferronickel residue is subjected to leaching at normal pressure to obtain a leaching solution and a leaching residue; the leaching solution is reused in the first high-pressure acid leaching, and the leaching residue is conveyed to a copper factory for further treatment;
(4) precipitating: ammonium chlorate is added in the copper-removed filtrate in step (3) to oxidize ferrous ions in the copper-removed filtrate, and heated at a temperature between 60° C. to 70° C. to remove the acetic acid, so as to prevent the acetic acid from affecting the subsequent extracting process;
(5) precipitating under control: ammonium hydroxide is added in the filtrate obtained in step (4), and pH of the filtrate is controlled in a range of 3 to 3.5, and filtration is performed again to obtain a ferric hydroxide precipitate and a nickel-containing filtrate; the ferric hydroxide precipitate is washed and heated to obtain ferric oxide red.

2. A wet treatment method for ferronickel, comprising the following steps:
(1) pretreating a raw material: ferronickel having a nickel content of 25.85% is pulverized to powders or particles;
(2) performing high-pressure acid leaching: in a high-pressure oxygen atmosphere at 3.0 MPa and 50° C., the pulverized raw material obtained in step (1) is subjected to acid leaching with sulfuric acid having a concentration of 8 mol/L, and acetylacetone is added in to obtain a slurry mixture; a solid-liquid ratio of the slurry mixture is 1:200 g/mL, and the acid leaching reaction is performed for 1.5 h;
(3) filtrating: after completing the reaction in step (2), filtration is performed to obtain a filtrate and a residue; the pulverized ferronickel obtained in step (1) is added in the filtrate and subjected to a second leaching to displace the small number of copper ions; filtration is performed again to obtain a ferronickel reside and a copper-removed filtrate; the ferronickel residue is reused in the first high-pressure acid leaching in step (2); after a plurality of cycles, when the ferronickel residue is tested to reach a predetermined copper content, the ferronickel residue is subjected to leaching at normal pressure to obtain a leaching solution and a leaching residue; the leaching solution is reused in the first high-pressure acid leaching, and the leaching residue is conveyed to a copper factory for further treatment;
(4) precipitating process: ammonium nitrate is added in the copper-removed filtrate in step (3) to oxidize ferrous ions in the copper-removed filtrate, and heated at a temperature between 75° C. to 85° C. to remove the acetylacetone, so as to prevent the acetylacetone from affecting the subsequent extracting process;
(5) precipitating under control: ammonium hydroxide is added in the filtrate obtained in step (4), and pH of the filtrate is controlled in a range of 3 to 3.5, and filtration is performed again to obtain a ferric hydroxide precipitate and a nickel-containing filtrate; the ferric hydroxide precipitate is washed and heated to obtain ferric oxide red.

3. A wet treatment method for ferronickel, comprising the following steps:
(1) pretreating a raw material: ferronickel having a nickel content of 55.35% is pulverized to powders or particles;
(2) performing high-pressure acid leaching: in a high-pressure oxygen atmosphere at 5.0 MPa and 70° C., the pulverized raw material obtained in step (1) is subjected to acid leaching with sulfuric acid having a concentration of 5 mol/L, and oxalic acid is added in to obtain a slurry mixture; a solid-liquid ratio of the slurry mixture is 1:300 g/mL, and the acid leaching reaction is performed for 3 hours;
(3) filtrating: after completing the reaction in step (2), filtration is performed to obtain a filtrate and a residue; the pulverized ferronickel obtained in step (1) is added in the filtrate and subjected to a second leaching to displace the small number of copper ions; filtration is performed again to obtain a ferronickel residue and a copper-removed filtrate; the ferronickel residue is reused in the first high-pressure acid leaching in step (2); after a plurality of cycles, when the ferronickel residue is tested to reach a predetermined copper content, the ferronickel residue is subjected to leaching at normal pressure to obtain a leaching solution and a leaching residue; the leaching solution is reused in the first high-pressure acid leaching, and the leaching residue is conveyed to a copper factory for further treatment;
(4) precipitating: ammonium nitrate is added in the copper-removed filtrate in step (3) to oxidize ferrous ions in the copper-removed filtrate, and heated at a temperature between 80° C. to 95° C. to remove the oxalic acid, so as to prevent the oxalic acid from affecting the subsequent extracting process;
(5) precipitating under control: ammonium hydroxide is added in the filtrate obtained in step (4), and pH of the filtrate is controlled in a range of 3 to 3.5, and filtration is performed again to obtain a ferric hydroxide precipitate and a nickel-containing filtrate; the ferric hydroxide precipitate is washed and heated to obtain ferric oxide red.

* * * * *